Aug. 20, 1968 D. M. ZALL 3,397,964
SPOT TEST FOR TITANIUM IN Cu-Ni ALLOY
Filed Jan. 28, 1965
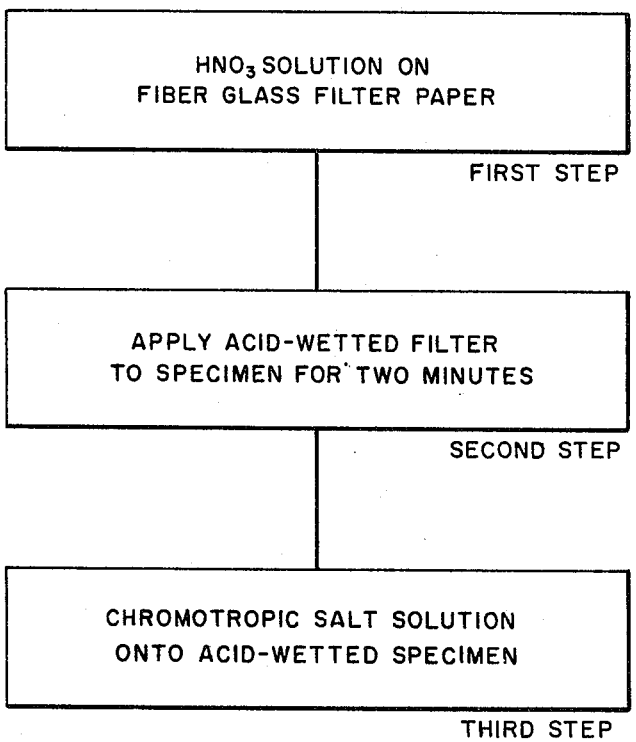
INVENTOR.
DAVID M. ZALL
BY
ATTYS.

United States Patent Office 3,397,964
Patented Aug. 20, 1968

3,397,964
SPOT TEST FOR TITANIUM IN Cu-Ni ALLOY
David M. Zall, Annapolis, Md., assignor to the United States of America as represented by the Secretary of the Navy
Filed Jan. 28, 1965, Ser. No. 428,883
5 Claims. (Cl. 23—230)

ABSTRACT OF THE DISCLOSURE

A method for performing a spot test for differentiating Monel from K-Monel by testing for the presence of titanium in K-Monel. The test is performed by placing a solution of nitric acid on a fiberglass filter paper on the surface to be tested. A chromotropic salt solution is then added to the filter paper and the presence of titanium is indicated by the appearance of a red color on the filter paper.

---

The invention described herein may be manufactured and used by or for the Government of the United States of America for governmental purposes without the payment of any royalties thereon or therefor.

This invention relates to an improved chemical spot test to differentiate Monel from K-Monel.

More particularly, this invention is directed to a simple chemical spot test based upon the color developed when titanium ion, present in K-Monel but not in Monel, is treated first with nitric acid and then with the disodium salt of chromotropic acid. The test can be manipulated by nontechnical personnel under conditions of poor lighting and limited accessibility.

In certain instances aboard a submarine it is required that stud and bolt fasteners be made of K-Monel for submarine hull integrity. In order to avoid a possible erroneous use of Monel studs and bolts in place of K-Monel, it is necessary to have an accurate and simple chemical spot test that can be used by nontechnical personnel.

Two elements, aluminum and titanium are present in K-Monel and absent in Monel, therefore one way to differentiate Monel from K-Monel is to establish the presence of either aluminum or titanium.

It may be recalled that K-Monel has the following typical composition:

| | Percent present |
|---|---|
| C | 0.19 |
| Mn | 0.57 |
| Fe | 1.06 |
| S | 0.006 |
| Si | 0.29 |
| Cu | 29.90 |
| Ni | 64.24 |
| Al | 3.21 |
| Ti | 0.51 | and typically Monel:

| | Percent present |
|---|---|
| C | 0.15 |
| Mn | 0.87 |
| Fe | 1.40 |
| S | 0.01 |
| Si | 0.20 |
| Cu | 29.20 |
| Ni | 68.15 |
| Al | — |
| Ti | — |

The determination of the presence of aluminum or titanium in alloys even in the laboratory is somewhat difficult. It is known that chromotropic acid or its sodium salt forms a colored complex with titanium. The color of the complex depends to a critical extent on the acidity of the solution. The pH must be rigidly controlled to obtain reproducible qualitative results, that is consistency in the reproduction of the color complex.

The determination of titanium at pH 6.2 has been studied by workers in the art and it has been found that the color complex resulting from the reaction of the chromotropic acid reagent and the titanium was sensitive to light over a short period of time. However, immediate color comparisons with freshly prepared reagent yielded accurate quantitative data. At pH 1, the titanium chromotropic acid color complex is yellow; at pH 2.5, it is red; at pH 4, it is orange; at pH 5 it is deep yellow. Under rigid laboratory control some consistence of reproducibility may be obtained.

Prior art attempts at providing a "simple" test, that is, one for unskilled personel for distinguishing the presence of titanium have not been very successful. For example, in one prior art method, concentrated nitric acid was applied to the surface of a K-Monel specimen resulting in the formation of a slightly green precipitate in a blue-green solution. When the nitric acid is applied to Monel, a clear blue-green solution results. It has been found difficult even for experienced chemists to distinguish between K-Monel and Monel by this method because of the closeness in the resulting color complexes.

The present invention provides a novel and simple spot test for detecting titanium in an alloy so that K-Monel may be distinguished from Monel. This spot test is based somewhat on the quantitative laboratory test under ideal conditions, but arranged so that unskilled personnel may carry out the test. Briefly stated, the pH of the specimen/solution is regulated by providing careful control of the quantity of nitric acid used. Interference caused by other alloy elements is overcome by the deliberately excessive use of the chromotropic salt for neutralizing any excess nitric acid. This test as applied to K-Monel and Monel respectively results in radically different, easily observed colors which are consistently reproducible.

An object of the present invention is the provision of a simple chemical spot test for differentiating Monel from K-Monel.

Another object is to provide a test to ascertain that K-Monel studs and bolts are being used as fasteners rather than Monel.

A further object of the invention is the provision of a simple test for K-Monel that may be performed outside of the laboratory by unskilled personnel.

Still another object is to provide a spot test to distinguish K-Monel from Monel that is uncomplicated and may be adequately performed under poor lighting and limited accessibility.

These and other objects, features and advantages of the present invention will be better understood by reference to the following description taken in connection with the accompanying drawings in which:

The single figure shows in block flow diagram the steps of the spot test according to the invention.

As a preliminary step shown in the drawing, the specimen should be cleaned to obtain a smooth reactive surface, free from paint, dirt, grease or oil and oxide film. A suitable solvent may be used for the removal of paint or grime. For the removal of the oxide film, fine sandpaper, emery cloth or a file may be used. If the condition necessitates grinding, light pressure should be used. The preparaiton is completed by removal of dust with a piece of filter paper.

By the phrase "1:1 nitric acid solution" it is meant that concentrated nitric acid (69.5% $HNO_3$, 30.5% water) is mixed with a like volume of water. There is shown in the next step the placing of one drop (i.e., 1/10 milliliter) of 1:1 nitric acid solution on a fiberglass filter paper. Next, the acid wetted fiberglass filter paper is pressed against the cleaned portion of the specimen for a period of 2 minutes. Then one drop of chromotropic salt solution is placed upon the acid-wetted paper. The appearance of a scarlet-red or violet-red color indicates the specimen is K-Monel. Preferably, as a final step the foregoing spot test should be compared with a control test simultaneously performed on a K-Monel specimen of known composition. The red color is developed immediately upon application of the drop of chromotropic salt solution.

After the nitric acid comes in contact with the specimen, if there is no reaction the specimen is probably stainless steel or other high chromium nickel alloy. If there is a reaction but no blue or greenish-blue color develops then the specimen is not Monel or K-Monel but is ferrous, white metal, aluminum or aluminum alloy.

If a blue or greenish-blue color appears, the specimen is either Monel or K-Monel.

In situations where titanium content of the K-Monel alloy being tested is low, a nitric acid solution of one part water to 3 parts concentrated nitric acid may be used. In carrying out a general program of spot testing, it is preferred that the chromotropic salt solution be prepared daily. The chromotropic salt solution may be prepared by dissolving one gram of the disodium salt of chromotropic acid in 20 milliliters of distilled water.

The nitric acid solution may be applied directly to the cleaned portion of the specimen. Carrying out the test in this manner does involve the risk of accidental spilling of the nitric acid. The use of fiberglass filter paper for receiving the drop of nitric acid solution avoids the risk of spillage of the acid. A preferred size for the filter paper is a circle of 2.4 centimeters in diameter. Where the nitric acid solution is applied directly to the specimen no filter paper is used at all and the drop of chromotropic salt is placed directly on the acid-wetted specimen.

It should be understood that the foregoing disclosure relates to only a preferred embodiment of the invention and that numerous modifications or alterations may be made therein without departing from the spirit and the scope of the invention as set forth in the appended claims.

What is claimed is:

1. A spot test for use in determining the existence of titanium in K-Monel, said spot test comprises:
   placing 0.1 ml. of a 1:1 nitric acid solution on a fiberglass filter paper;
   pressing the acid wetted fiberglass filter in intimate contact with the specimen for a period of 2 minutes; and
   adding 0.1 ml. of a solution comprising 1 gr. of disodium salt of chromotropic acid and 20 ml. of water onto the acid wetted filter paper whereby if a red or violet-red color appears, the presence of titanium is indicated and the specimen is K-Monel, and whereby if a blue-green color appears, the specimen is Monel.

2. A spot test for use in determining titanium content in K-Monel as described in claim 1 including the step of simultaneously performing the spot test on a known K-Monel specimen thereby affording comparison.

3. A chemical spot test for use by nontechnical personnel to avoid the erroneous use of Monel studs and bolts where K-Monel studs and bolts should be used for submarine hull integrity comprising:
   applying .1 ml. of a nitric acid solution of a concentration within the range of 1:1 to 3:1 concentrated nitric acid to water to a fiberglass filter paper;
   applying the acid wetted fiberglass filter paper to a cleaned surface of a specimen for at least two minutes;
   removing the filter paper from the specimen;
   applying .1 ml. of a solution of 1 gr. of disodium salt of chromotropic acid to 20 ml. of water to the acid wetted filter paper whereby the presence of titanium in K-Monel will cause a red color to develop, and whereby if the specimen is Monel, a blue-green color results.

4. A spot test for distinguishing between a Monel and K-Monel specimen comprising the steps of:
   removing foreign matter from a portion of the specimen;
   applying to a fiberglass filter paper .1 ml. of 1:1 solution of concentrated nitric acid;
   pressing the acid wetted filter paper in intimate contact with the cleaned portion of the specimen for about two minutes;
   applying to said acid wetted portion of the filter paper a solution of 1 gr. disodium salt of chromotropic acid to 20 ml. of water in an amount sufficient to fully develop the acid wetted portion of the filter paper;
   whereby the developed complex is scarlet- or violet-red if the specimen is K-Monel, and is blue-green if the specimen is Monel.

5. The spot test according to claim 4 but further comprising the step of:
   comparing the specimen spot test with a spot test simultaneously performed on a known K-Monel specimen.

References Cited

Codell, "Analytical Chemistry of Titanium Metals and Compounds," vol. 9, 1959, pp. 93–94.

Merck Index of Chemicals and Drugs, 7th ed., 1960, p. 257.

Brand et al., "Spectrophotometric Investigation of Reaction of Titanium With Chromotropic Acid," Analytical Chemistry, vol. 25, No. 4, April 1953, pp. 567–571.

MORRIS O. WOLK, *Primary Examiner.*

R. E. SERWIN, *Assistant Examiner.*